United States Patent
Jung et al.

(10) Patent No.: US 9,338,746 B2
(45) Date of Patent: May 10, 2016

(54) METHOD AND APPARATUS FOR MEASURING SYSTEM SIGNAL

(75) Inventors: Jung Soo Jung, Seongnam-si (KR); Soeng Hun Kim, Yongin-si (KR); Kyeong In Jeong, Suwon-si (KR); Sang Bum Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 3 days.

(21) Appl. No.: 13/978,520

(22) PCT Filed: Jan. 6, 2012

(86) PCT No.: PCT/KR2012/000148
§ 371 (c)(1),
(2), (4) Date: Sep. 30, 2013

(87) PCT Pub. No.: WO2012/093887
PCT Pub. Date: Jul. 12, 2012

(65) Prior Publication Data
US 2014/0016492 A1    Jan. 16, 2014

(30) Foreign Application Priority Data
Jan. 7, 2011    (KR) .................... 10-2011-0001840

(51) Int. Cl.
H04W 24/10 (2009.01)
H04W 52/02 (2009.01)

(52) U.S. Cl.
CPC .......... *H04W 52/0225* (2013.01); *H04W 24/10* (2013.01); *Y02B 60/50* (2013.01)

(58) Field of Classification Search
None
See application file for complete search history.

(56) References Cited

U.S. PATENT DOCUMENTS

| 2005/0070246 A1* | 3/2005 | Qazi et al. | 455/347 |
| 2008/0160918 A1* | 7/2008 | Jeong et al. | 455/67.11 |
| 2011/0269447 A1* | 11/2011 | Bienas et al. | 455/422.1 |

FOREIGN PATENT DOCUMENTS

| KR | 10-2008-0066561 | 7/2008 |
| KR | 10-2009-0099511 | 9/2009 |

(Continued)

OTHER PUBLICATIONS

International Search Report dated Sep. 12, 2012 in connection with International Patent Application No. PCT/KR2012/000148, 4 pages.

(Continued)

*Primary Examiner* — Omar Ghowrwal (57) ABSTRACT

The present invention relates to a method and apparatus for measuring a signal. According to one embodiment of the present invention, a signal measuring method may comprise the steps of: determining whether or not a current subframe corresponds to a measurement period; measuring a serving cell signal when the current subframe corresponds to the measurement period; determining whether a current measurement mode is a normal scan mode or a short scan mode in which a serving cell signal is more frequently measured than in the normal scan mode; determining whether or not the measured serving cell signal is less than a preset low signal threshold value when the current measurement mode is the normal scan mode; and changing the current measurement mode to the short scan mode when the measured serving cell signal is less than the low signal threshold value. According to one embodiment of the present invention, a system signal measuring method and apparatus which can quickly reflect the surrounding environment while efficiently using power is provided.

20 Claims, 7 Drawing Sheets

(56) References Cited

FOREIGN PATENT DOCUMENTS

| KR | 10-2009-0115180 | 11/2009 |
| KR | 10-2010-0139047 | 12/2010 |

OTHER PUBLICATIONS

Written Opinion of International Searching Authority dated Sep. 12, 2012 in connection with International Patent Application No. PCT/KR2012/000148, 4 pages.

3rd Generation Partnership Project 2; "Upper Layer (Layer 3) Signaling Standard for cdma2000 Spread Spectrum Systems—Release A Addendum 2"; Feb. 2002; 1,664 pages.

3rd Generation Partnership Project 2; "cdma2000 High Rate Packet Data Air Interface Specification"; Version 3.0; Sep. 2006; 1,164 pages.

3GPP TS 25.331 v11.1.0; "Radio Resource Control (RRC); Protocol specification" Release 11; Mar. 2012; 1,911 pages.

3GPP TS 25.36.331 v11.0.0; "Radio Resource Control (RRC); Protocol specification" Release 11; Jun. 2012; 302 pages.

* cited by examiner

METHOD AND APPARATUS FOR MEASURING SYSTEM SIGNAL

CROSS-REFERENCE TO RELATED APPLICATION(S)

The present application claims priority under 35 U.S.C. §365 to International Patent Application No. PCT/KR2012/000148 filed Jan. 6, 2012, entitled "METHOD AND APPARATUS FOR MEASURING SYSTEM SIGNAL". International Patent Application No. PCT/KR2012/000148 claims priority under 35 U.S.C. §365 and/or 35 U.S.C. §119(a) to Korean Patent Application No. 10-2011-0001840 filed Jan. 7, 2011 and which are incorporated herein by reference into the present disclosure as if fully set forth herein.

BACKGROUND OF THE INVENTION

1. Field of the Invention

The present invention relates to a system signal measurement method and apparatus.

2. Description of the Related Art

The mobile communication systems targeted by the present invention may include the $1^{st}$ Generation analog, the $2^{nd}$ Generation digital, the $3^{rd}$ Generation IMT-2000 high speed multimedia service, and the $4^{th}$ Generation ultrahigh speed multimedia service mobile communication systems.

Among the $3^{rd}$ generation mobile communication systems, CDMA HRPD (High Rate Packet Data) system and WCDMA HSPA (High Speed Packet Access) are representative mobile communication systems having the channel formats for high data rate. The CDMA HRPD system is the system using Code Division Multiple Access (CDMA).

Figure 1:
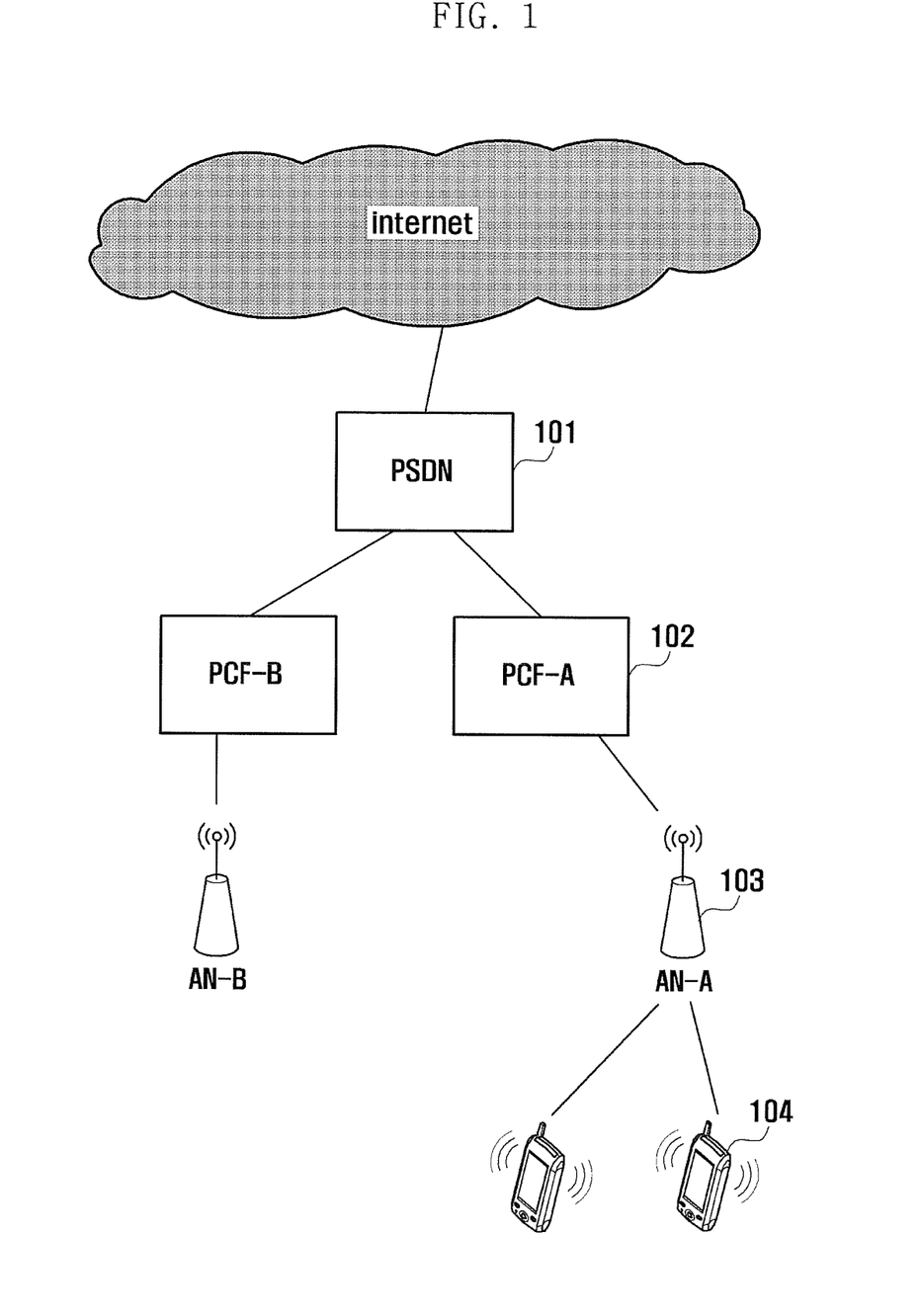
FIG. 1 is a diagram illustrating architecture of conventional HRPD system.

FIG. 1 is a diagram illustrating architecture of conventional HRPD system.

The HRPD system includes a Packet Data Service Node (PDSN) 101 connected to the Internet for transmitting high speed packet data to the base station 103 and a Packet Control Function (PCF) for controlling the base station 103. The base station 103 performs radio communication with plural terminals 104 and transmits high speed packet data to the terminal having the best data rate.

The $4^{th}$ Generation mobile communication system evolved from the $3^{rd}$ Generation mobile communication system such as HRPD system aims at the data rate of 20 Mbps or higher for high speed multimedia service. The $4^{th}$ generation mobile communication system uses the orthogonal frequencies scheme such as Orthogonal Frequency Division Multiplexing (OFDM). LTE and LTE-Advanced (LTE-A) systems are under the standardization process as representative $4^{th}$ generation mobile communication systems.

Figure 2:
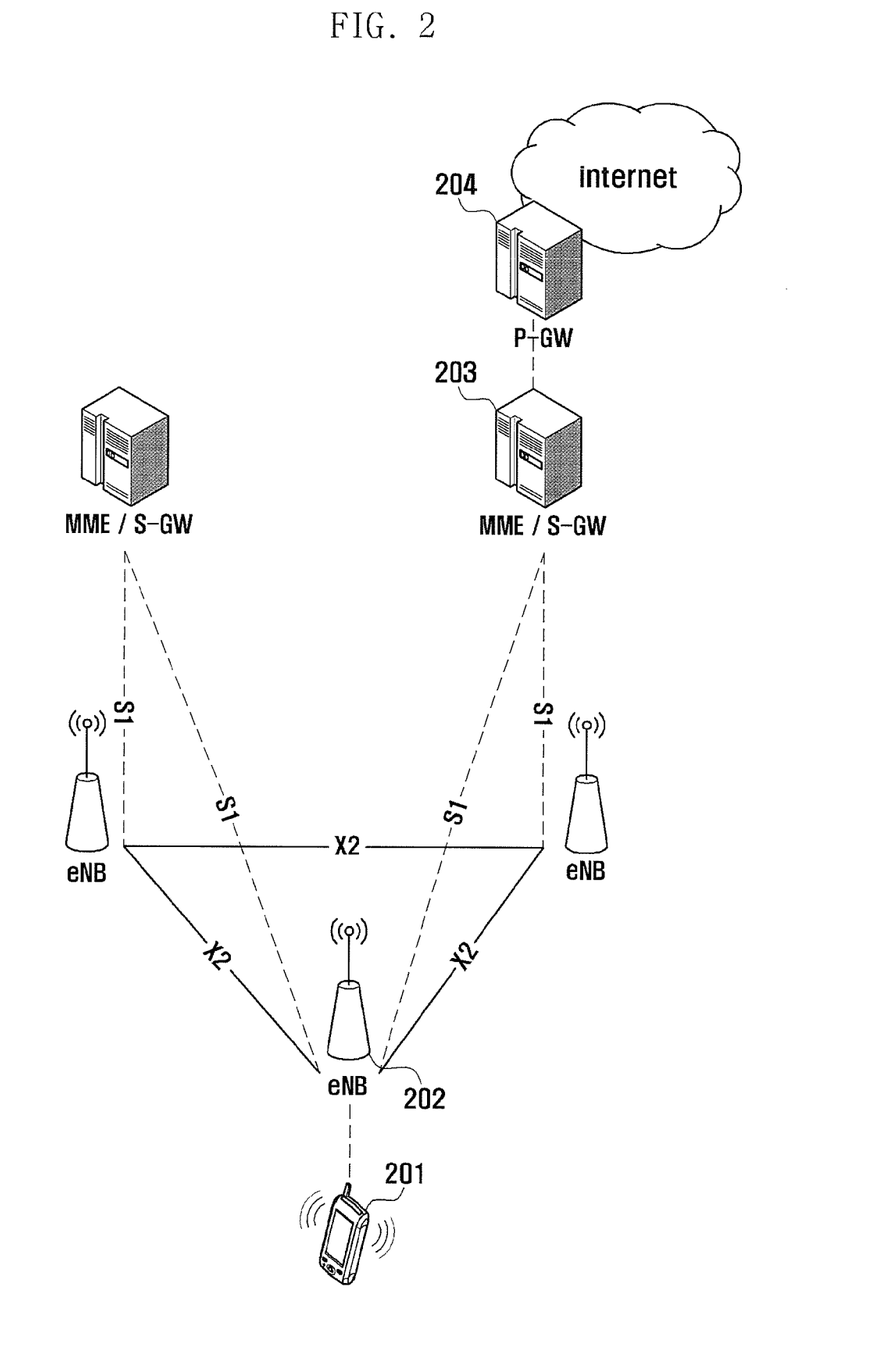
FIG. 2 is a diagram illustrating architecture of a typical LTE system.

FIG. 2 is a diagram illustrating architecture of a typical LTE system.

The LTE system performs radio communication with plural UEs 201 and includes eNBs 202 for providing high speed multimedia service, MME/S-GWs (Serving Gateway) 203 responsible for managing UE mobility, call processing, and data path management, and a Packet Data Network Gateway (PDN-GW or P-GW) 204 connected to Internet and delivers the high speed packet data to the UE 201 via the eNBs 202.

With the advance of communications technologies, it is a tendency that conventional standalone devices operating without connection to a communication network such as control devices, metering devices, and electric appliances are being connected through wired and/or wireless communication system. Such devices connected to the communication system are capable of metering without human intermediary so as to improve efficiency and reduce maintenance cost.

Compared to the conventional human-centric communication, the communication between the communication system and the control devices, metering devices, and electric appliances are referred to as Machine to Machine (M2M) communication. In the early 1990s when the concept of M2M communication has been introduced, the remote control and telematics are considered as the examples of M2M communication and the related market has been also very limited. However, the M2M communication technology has grown rapidly to be widespread all around world as well as in our country for with the diversification of M2M-capable devices for last a few years. Particularly, the M2M communication gives a large influence in the fields such as Point Of Sales (POS) and Fleet Management in security-related application market, remote monitoring of machine and equipment, and smart metering for measuring operation time of construction equipment and metering heat and electricity consumption.

The M2M terminal has several characteristics as compared to the convention terminal. Among them, the representative characteristics are as follows.

1. The devices such as controller and moves not at all or a sporadically.
2. Some M2M terminals may perform communication of data for predetermined time duration.
3. Some M2M terminals are tolerable to delay in data communication (delay tolerant).
4. Some M2M terminals are not necessary to have voice telephony function.
5. The M2M terminal is not necessary to receive paging from the mobile communication system and but capable of requesting for connection setup when data communication is required.
6. There may be the M2M terminals greater than the conventional communication terminals in number in the area with high density population as the M2M devices are diversified.
7. The battery-powered M2M device is required to consume the battery efficiently because it may not allowed for changing the battery frequently. That is, the M2M device has to be designed to consume the power efficiently.

In the case of the M2M device operating without paging, there is no need of monitoring the messages transmitted by the eNB frequently to receive the paging. In this case, it is possible to achieve its object only by receiving the control channel sporadically to acquire the system information transmitted by the system. It is also very important technique for securing high power utilization efficiency to reduce the frequency of receiving the control channel.

In order to introduce such an operation in the LTE system, a method for increasing the system observation period in the idle state has been introduced. The period at which the UE observes the system in idle state is referred to as Discontinuous Reception (DRX) period.

Figure 3:
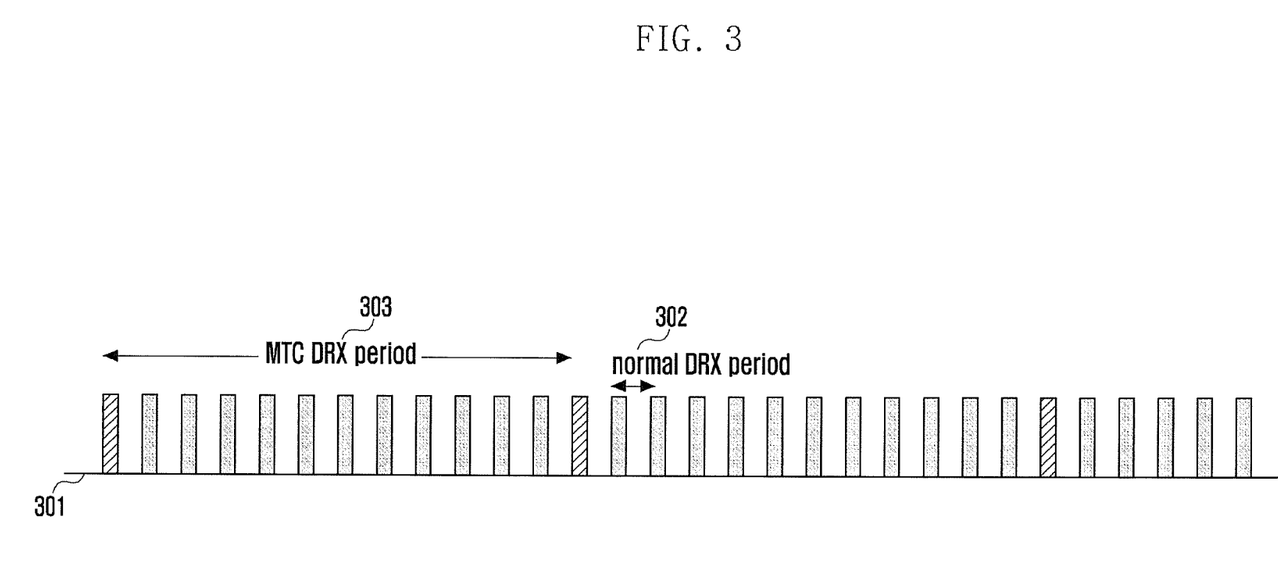
FIG. 3 is a diagram illustrating the DRX periods of the conventional terminal and the M2M terminal.

FIG. 3 is a diagram illustrating the DRX periods of the conventional terminal and the M2M terminal.

In FIG. 3, the horizontal axis 301 denotes system frame number as transmission period of LTE. The M2M terminal may be designed to have the DRX period 303 which is relatively long as compared to that of the conventional terminal.

In the LTE system, the radio channel observation period is defined in association with the DRX period. That is, the UE perform received signal strength of the radio channel as many as given in the DRX period. Accordingly, if the DRX period is elongated, this means that the conventional channel variation monitoring period is elongated too and, as a consequence, the terminal cannot reflect the change in radio environment immediately. That is, even when aggregating multiple radio channel measurement results to determine cell reselection in the bad channel environment, the cell reselection determination is also delayed due to the long radio channel measurement period. This may cause a problem of paging reception failure for several DRX periods.

DISCLOSURE OF INVENTION

Technical Problem

The present invention has been made in an effort to solve the above problem, and it is an object of the present invention to provide a system signal measurement method and apparatus that is capable of reflecting the ambient environment immediately while consuming the power efficiently.

Solution to Problem

In order to accomplish the above object, a signal measurement method includes determining whether a current subframe corresponds to a measurement period; measuring, when the current subframe corresponds to the measurement period, of a serving cell signal; determining whether current measurement mode is a normal scan mode or a short scan mode for measuring the serving cell signal more frequently than the normal scan mode; determining, when the current measurement mode is the normal scan mode, whether the measured serving cell signal is less than a predetermined low signal threshold; and switching, when the measured serving cell signal is less than the low signal threshold, the current measurement mode to the short scan mode.

In order to accomplish the above object, a terminal includes a controller which determines whether a current subframe corresponds to a measurement period; and a transceiver which measures, when the current subframe corresponds to the measurement period, a serving cell signal, wherein the controller determines whether current measurement mode is a normal scan mode or a short scan mode for measuring the serving cell signal more frequently than the normal scan mode; determines, when the current measurement mode is the normal scan mode, whether the measured serving cell signal is less than a predetermined low signal threshold, and switches, when the measured serving cell signal is less than the low signal threshold, the current measurement mode to the short scan mode.

Advantageous Effects

According to an embodiment of the present invention, it is possible to provide a system signal measurement method and apparatus capable of reflecting the adjacent environment quickly while using the power efficiently.

According to an embodiment of the present invention, a M2M terminal is capable of selecting the best eNB quickly in a bad channel environment so as to avoid failing connection setup or missing SMS message.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts, and Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

As aforementioned, it is proposed to increase the DRX period as the system observation period in idle mode to support the characteristics of the M2M terminal efficiently. In the LTE system, the radio channel listening period is in interoperation with the DRX period. That is, the terminal measures the received signal strength as many as given in the DRX period. Accordingly, when the DRX period is extended, the channel variation observation period is extended too and, as a consequence, the terminal cannot reflect the change in ratio environment immediately.

In order to solve this problem, the present invention proposes a method for the M2M terminal to change the signal measurement period according to the ambient channel environment including the serving eNB so as to reflect the channel condition immediately.

Figure 4:
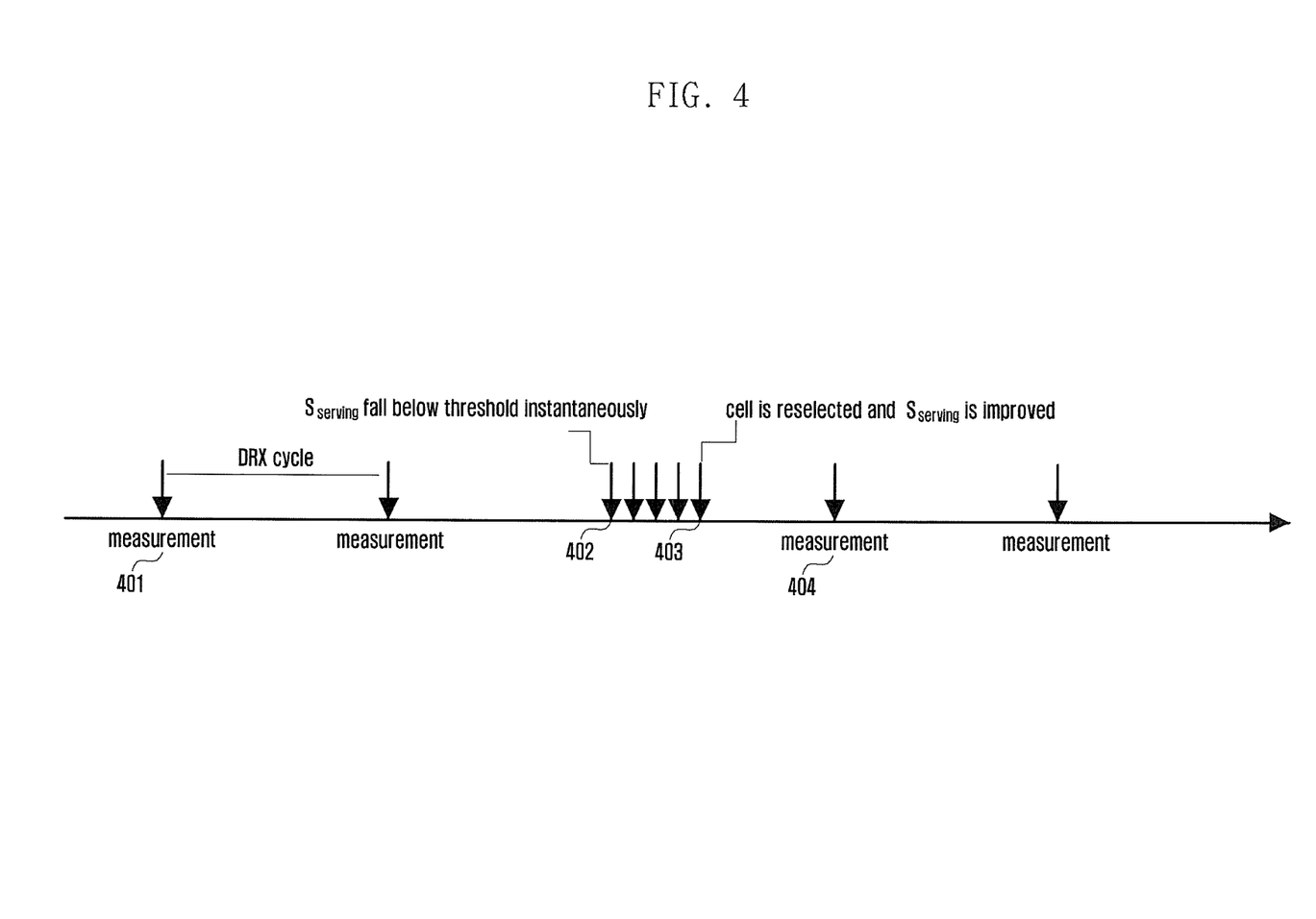
FIG. 4 is a diagram illustrating a DRX period configuration procedure according to an embodiment of the present invention.

FIG. 4 is a diagram illustrating a DRX period configuration procedure according to an embodiment of the present invention. The M2M terminal measures signals at every DRX cycle as denoted by reference number 401. In the following description, the state of measuring signals as many as a predetermined number of times is referred to as "Normal scan mode."

Afterward, the M2M terminal detects that the received signal strength of the serving eNB is less than a predetermined low threshold as denoted by reference number 402. In this case, the M2M terminal reduces the signal measurement period to a value negotiated between the eNB and the terminal (a value less than the original period) so as to perform measurement frequently. In the following description, this state of measuring the signals more frequently is referred to as "Short scan mode."

The M2M terminal detects that the received signal strength from the serving eNB is greater than a predetermined high threshold as denoted by reference number 403. In this case, the M2M terminal recovers the measurement period to the original length. In the case of changing the communication target to a new eNB (reselection), it may recover the signal measurement period to the original signal measurement period (normal scan mode) at the timing 403.

The present invention proposes a method for changing the DRX period according to the channel condition to change the signal measurement period. At this time, the number of signal measurement times may be maintained identically within the DRX period. Also, the present invention proposes a method for changing the number of measurement times within the DRX period while maintaining the DRX period.

Figure 5:
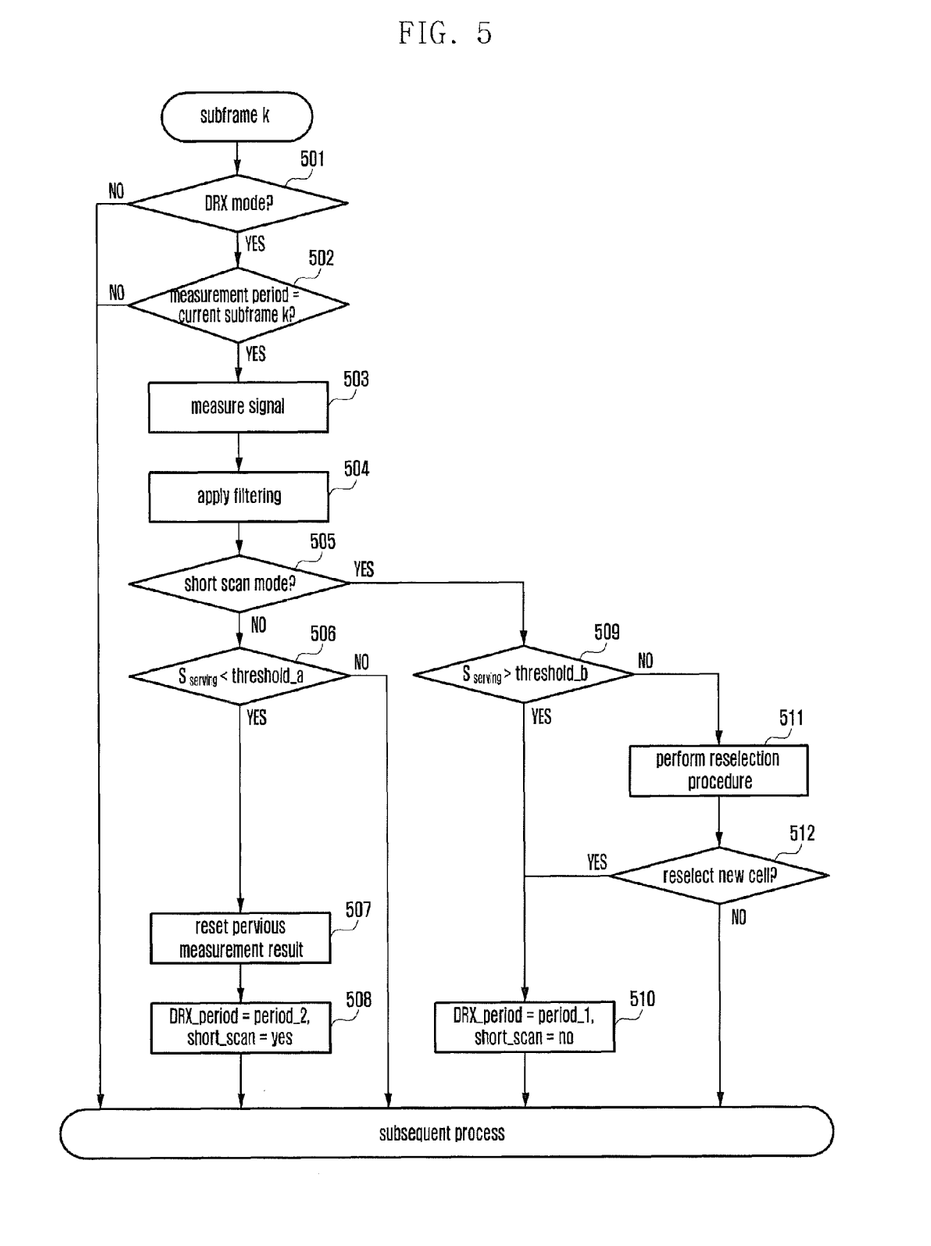
FIG. 5 is a flowchart illustrating the signal measurement procedure of the M2M terminal according to the first embodiment of the present invention.

FIG. 5 is a flowchart illustrating the signal measurement procedure of the M2M terminal according to the first embodiment of the present invention.

Referring to FIG. 5, the M2M terminal determines whether it is operating in the DRX mode at step 501. If it is not in DRX mode, the terminal performs the operation as specified in legacy LTE. Since the legacy LTE operation is well-known, detailed description thereon is omitted herein. If the terminal is operating in DRX mode, the procedure goes to step 502.

The M2M terminal determines whether the subframe k corresponds to the signal measurement period at step 502. If the subframe k does not correspond to the signal measurement period, the terminal performs the operation specified in the legacy LTE. If the subframe k corresponds to the signal measurement period in DRX mode, the procedure goes to step 503.

The M2M terminal performs signal measurements for neighbor eNBs at step 503. Next, the terminal performs filtering by reflecting a certain ratio of newly measured value to the previous measurement value of the adjacent signals at step 504. The terminal uses the value filtered at step 504 as the measurement value to the neighbor eNB. The filtering operation of step 504 may be omitted. Afterward, the terminal determines whether it operates in short scan mode for receiving the adjacent signals at the short period at step 505. If it is not operating in the short scan mode, the procedure goes to step 506.

The terminal determines whether the signal measurement value of the serving eNB which is observed for call reception is less than the low threshold (threshold_a) at step 506. If the signal measurement value of the serving eNB is less than the low threshold, the procedure goes to step 507. The terminal initializes the previously stored measurement values at step 507. The terminal sets the DRX period to a value negotiated with the eNB at step 508. The DRX period may be set to a value less than the period for the normal scan mode at step 508. The terminal also sets the signal measurement period for the short scan mode at step 508. The steps subsequent to step 508 follow the operations of legacy LTE. If the signal measurement value of the serving eNB is equal to or greater than the low threshold at step 506, the subsequent process follows the operation of legacy LTE.

If it is operating in the short scan mode at step 505, the procedure goes to step 509. The terminal determines whether the signal measurement of the serving eNB is greater than a predetermined high threshold (threshold_b) at step 509. If the signal measurement of the serving eNB is greater than the high threshold, the procedure goes to step 510.

The terminal resets the DRX period to the period for the legacy normal scan mode and switches the adjacent signal measurement mode to the normal scan mode at step 510. The steps subsequent to step 510 follow the operations specified in the legacy LTE system.

If the signal measurement value of the serving eNB is equal to or less than the high threshold at step 509, the procedure goes to step 511. The UE performs operation associated with the serving eNB at step 511. The operation at step 511 is out of the scope of the present invention, detailed description thereon is omitted herein. The terminal determines whether a new serving eNB is selected as a result of step 511 at step 512.

If a new serving eNB is selected, the procedure goes to step 510. As described above, the terminal resets the DRX period to the value for use in the normal scan mode and switches the adjacent signal measurement mode to the normal scan mode at step 510. If no new serving eNB is selected at step 512, the terminal performs the subsequent operation as specified in the legacy LTE.

Figure 6:
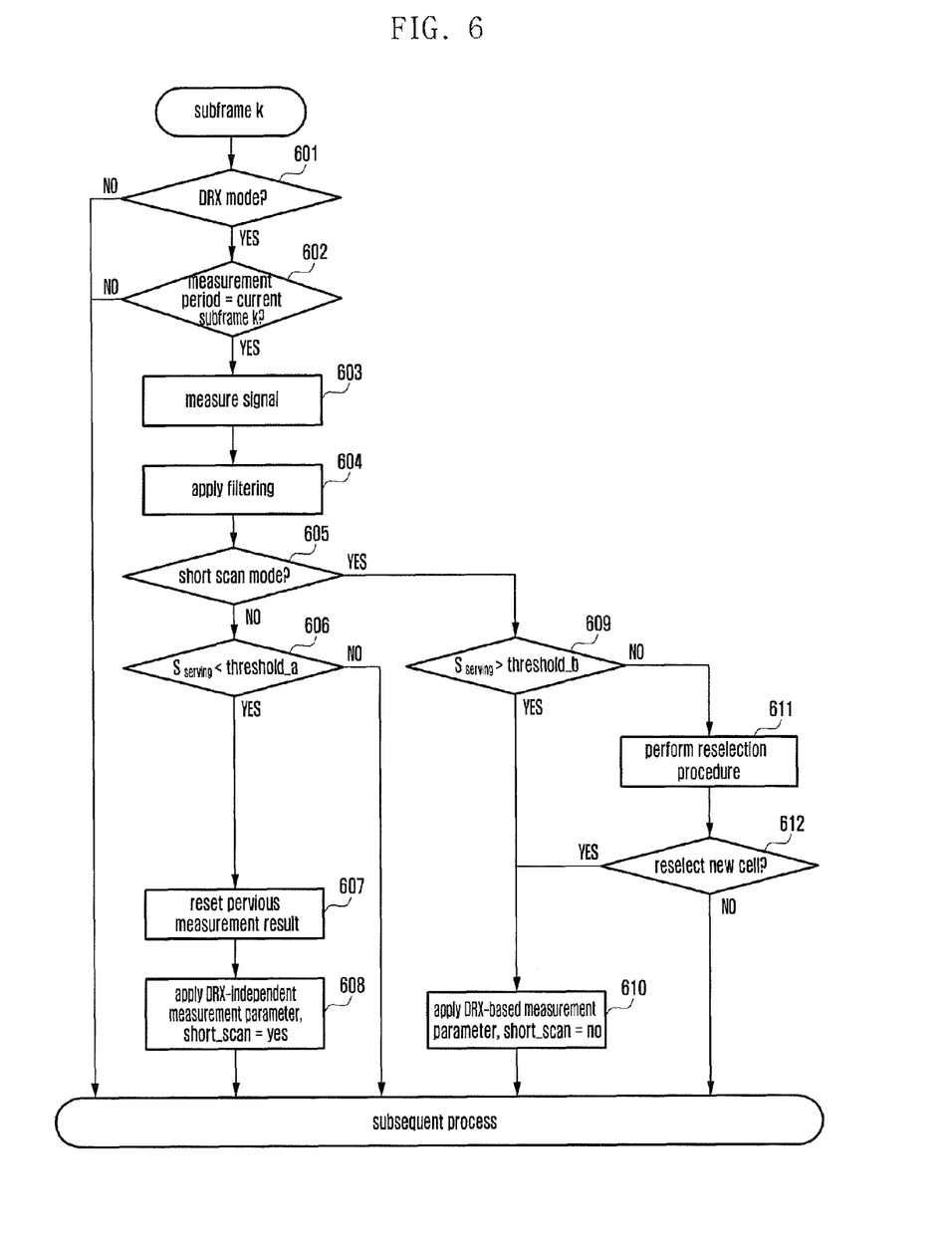
FIG. 6 is a flowchart illustrating the signal measurement procedure of the M2M terminal according to the second embodiment of the present invention.

FIG. 6 is a flowchart illustrating the signal measurement procedure of the M2M terminal according to the second embodiment of the present invention.

Referring to FIG. 6, the M2M terminal determines whether it operates in the DRX mode at step 601. If it is not in the DRX mode, the terminal performs the operation specified in the legacy LTE. Since the legacy LTE operation is well-known, detailed description thereon is omitted herein. If the terminal is operating in DRX mode, the procedure goes to step 602.

The M2M terminal determines whether the subframe k corresponds to the signal measurement period at step 602. If the subframe k does not correspond to the signal measurement period, the terminal performs the operation specified in the legacy LTE. If the subframe k corresponds to the signal measurement period in DRX mode, the procedure goes to step 603.

The M2M terminal performs signal measurements for neighbor eNBs at step 603. Next, the terminal performs filtering by reflecting a certain ratio of newly measured value to the previous measurement value of the adjacent signals at step 604. The terminal uses the value filtered at step 604 as the measurement value to the neighbor eNB. The filtering operation of step 604 may be omitted. Afterward, the terminal determines whether it operates in short scan mode for receiving the adjacent signals at the short period at step 605. If it is not operating in the short scan mode, the procedure goes to step 606.

The terminal determines whether the signal measurement value of the serving eNB which is observed for call reception is less than the low threshold (threshold_a) at step 606. If the signal measurement value of the serving eNB is less than the low threshold, the procedure goes to step 607. The terminal initializes the previously stored measurement values at step 607.

The terminal sets the DRX period to a value regardless of the DRX period negotiated with eNB at step 608. That is, the terminal may set the number of neighbor signal measurement within the DRX period to a value greater than a predetermined number. The terminal is also set to the period for measuring and determining the ambient signal strength to a length shorter or longer than the predetermined time. Also, it is possible to weight the value measured newly by changing the filtering scheme as compared to the previously measured signal so as to be applied to the final measurement value more significantly. The terminal sets the short scan mode for the adjacent signal measurement afterward at step 608. The process subsequent process of step 608 follows the operation of the legacy LTE. If the signal measurement value of the serving eNB is equal to or greater than the low threshold at step 606, the subsequent process follows the operation of the legacy LTE.

If it is operating in the short scan mode at step 605, the procedure goes to step 609. The terminal determines whether the signal measurement of the serving eNB is greater than a predetermined high threshold (threshold_b) at step 609. If the signal measurement of the serving eNB is greater than the high threshold, the procedure goes to step 610.

The terminal resets the signal measurement-related settings to the values for use in the legacy normal scan mode and switches the neighbor signal measurement mode to the Normal scan mode at step 610. The process subsequent to step 610 follows the operation of the legacy LTE system.

If the signal measurement value of the serving eNB is equal to or less than the high threshold at step 609, the procedure goes to step 611. The UE performs operation associated with the serving eNB at step 611. The operation at step 611 is out of the scope of the present invention, detailed description thereon is omitted herein. The terminal determines whether a new serving eNB is selected as a result of step 611 at step 612. If a new serving eNB is selected, the procedure goes to step 610. As described above, the terminal resets the DRX period to the value for use in the normal scan mode and switches the adjacent signal measurement mode to the normal scan mode at step 610. If no new serving eNB is selected at step 512, the terminal performs the subsequent operation as specified in the legacy LTE.

Figure 7:
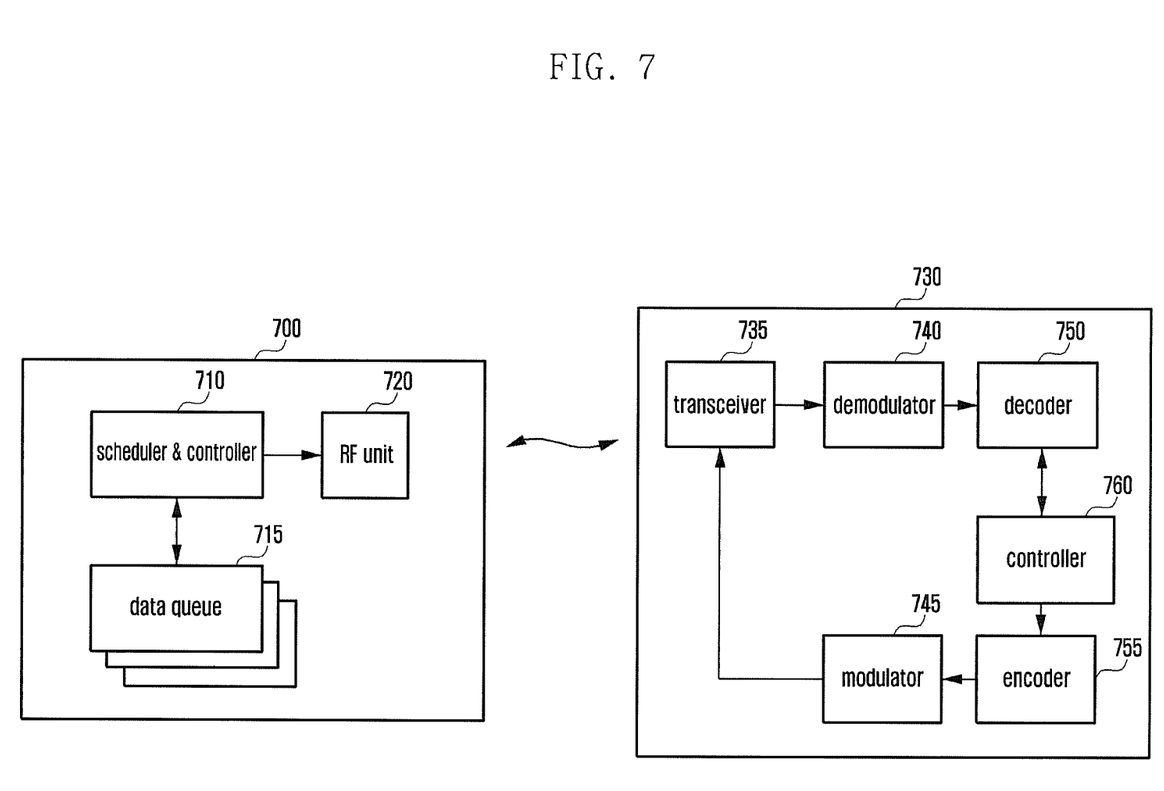
FIG. 7 is a block diagram illustrating the configurations of the terminal 730 and the eNB 700 according to an embodiment of the present invention.

FIG. 7 is a block diagram illustrating the configurations of the terminal 730 and the eNB 700 according to an embodiment of the present invention.

According to an embodiment of the present invention, the eNB 700 includes a scheduler & controller 710, a Radio Frequency (RF) unit 720, and a data queue 715. According to an embodiment of the present invention, the terminal includes a transceiver 735, a demodulator 740, a decoder 750, a controller 760, an encoder 755, and a modulator 745.

The controller 710 of the eNB 700 configures the parameters for controlling the signal measurement period such as thresholds and setting values and DRX period for use in one of the embodiments of the present invention. The control unit 710 may configure the parameter values in the middle of or after the connection setup, in negotiating the configuration values related to the radio access between the terminal 730 and the eNB 700, or based on the broadcast to all terminals within the coverage of the eNB 700. The data queue 715 of the eNB 700 stores the data received from a higher layer network node for per terminal or service. The scheduler & and controller 710 controls the user-specific or service-specific data inconsideration of the downlink channel condition, service properties, and fairness provided by the terminals. The RF unit 720 sends the selected data signal or control signal to the UE 730.

The controller 760 of the terminal 730 increases or decreases the signal measurement period based on the channel condition of the neighbor eNBs as well as the serving eNB according to any of embodiments of the present invention. If a new serving eNB is selected, The controller 760 resets the signal measurement period to the initial value. The terminal measures the signals received by the transceiver 735 at the measurement period determined by the controller 760. The terminal 730 demodulates the received signal by means of the demodulator 740, decodes the demodulated signal by means of the decoder, and determines and processes the decoded signal by means of the controller 760. The encoder 755 encodes the data to be transmitted, and the modulator 745 modulates the encoded data.

INDUSTRIAL APPLICABILITY

Although the description has been made with reference to particular embodiments, the present invention can be implemented with various modification without departing from the scope of the present invention. Thus, the present invention is not limited to the particular embodiments disclosed but will include the following claims and their equivalents.

What is claimed is:

1. A method implemented by a machine to machine (M2M) terminal for signal measurement in a communication system, the method comprising:
    determining whether a current subframe corresponds to a measurement period;
    measuring, when the current subframe corresponds to the measurement period, a serving cell signal;
    filtering the measured serving cell signal based on a particular ratio of the measured serving cell signal and a previously measured signal;
    determining whether a current measurement mode is a normal scan mode or a short scan mode to measure the serving cell signal more frequently than the normal scan mode;
    determining, when the current measurement mode is the normal scan mode, whether the measured serving cell signal is less than a predetermined low signal threshold; and
    switching, when the measured serving cell signal is less than the predetermined low signal threshold, the current measurement mode to the short scan mode.

2. The method of claim 1, further comprising resetting, when the current measurement mode is the normal scan mode and the measured serving cell signal is less than the predetermined low signal threshold, the measured serving cell signal.

3. The method of claim 2, further comprising changing, when the current measurement mode is the normal scan mode and the measured serving cell signal is less than the predetermined low signal threshold, a serving cell signal measurement parameter for discontinuous reception (DRX)-independent parameters.

4. The method of claim 1, further comprising:
    determining, when the current measurement mode is the short scan mod; whether the measured serving cell signal is greater than a predetermined high signal threshold; and
    switching, when the measured serving cell signal is greater than the predetermined high signal threshold, the current measurement mode to the normal scan mode.

5. The method of claim 4, further comprising:
    attempting, when the current measurement mode is the short scan mode and the measured serving cell signal is not greater than the predetermined high signal threshold, cell reselection; and
    switching, when a cell is selected as a result of cell reselection, the current measurement mode to the normal scan mode.

6. The method of claim 4, further comprising changing, when the current measurement mode is the short scan mode and the measured serving cell signal is greater than the high threshold, serving cell signal measurement parameters for discontinuous reception (DRX)-independent parameters.

7. The method of claim 5, further comprising changing, when a cell is reselected as a result of cell reselection, serving cell signal measurement parameters for discontinuous reception (DRX)-independent parameters.

8. A machine to machine (M2M) terminal for signal measurement in a communication system, the M2M terminal comprising:
    a hardware transceiver configured to receive a serving cell signal, wherein the serving cell signal is measured when a current subframe corresponds to a measurement period; and
    a hardware controller configured to:
        determine whether the current subframe corresponds to the measurement period, measure, when the current subframe corresponds to the measurement period, a serving cell signal, filter the measured serving cell signal based on a particular ratio of the measured serving cell signal and a previously measured signal, determine whether a current measurement mode is a normal scan mode or a short scan mode, wherein the short scan mode measures the serving cell signal more frequently than the normal scan mode, determine, when the current measurement mode is the normal scan mode, whether the measured serving cell signal is less than a predetermined low signal threshold, and switch, when the measured serving cell signal is less than the predetermined low signal threshold, the current measurement mode to the short scan mode.

9. The terminal of claim 8, wherein the hardware controller is configured to reset, when the current measurement mode is the normal scan mode and the measured serving cell signal is less than the predetermined low signal threshold, the measured serving cell signal.

10. The terminal of claim 9, wherein the hardware controller is configured to change, when the current measurement mode is the normal scan mode and the measured serving cell signal is less than the predetermined low signal threshold, a serving cell signal measurement parameter for discontinuous reception (DRX)-independent parameters.

11. The terminal of claim 8, wherein the hardware controller is configured to determine, when the current measurement mode is the short scan mode, whether the measured serving cell signal is greater than a predetermined high signal threshold and switch, when the measured serving cell signal is greater than the predetermined high signal threshold, the current measurement mode to the normal scan mode.

12. The terminal of claim 11, wherein the hardware controller is configured to attempt, when the current measurement mode is the short scan mode and the measured serving cell signal is not greater than the predetermined high signal threshold, cell reselection and switch, when a cell is selected as a result of cell reselection, the current measurement mode to the normal scan mode.

13. The terminal of claim 11, wherein the hardware controller is configured to change, when the current measurement mode is the short scan mode and the measured serving cell signal is greater than the high threshold, serving cell signal measurement parameters for discontinuous reception (DRX)-independent parameters.

14. The terminal of claim 12, wherein the hardware controller is configured to change, when a cell is reselected as a result of cell reselection, serving cell signal measurement parameters for discontinuous reception (DRX)-independent parameters.

15. A system for signal measurement in a communication system, the system comprising:
at least one base station; and
at least one machine to machine (M2M) terminal comprising:

a hardware transceiver configured to receive a serving cell signal, wherein the serving cell signal is measured when a current subframe corresponds to a measurement period, and a hardware controller configured to:
determine whether the current subframe corresponds to the measurement period, measure, when the current subframe corresponds to the measurement period, a serving cell signal, filter the measured serving cell signal based on a particular ratio of the measured serving cell signal and a previously measured signal, determine whether a current measurement mode is a normal scan mode or a short scan mode to measure the serving cell signal more frequently than the normal scan mode, determine, when the current measurement mode is the normal scan mode, whether the measured serving cell signal is less than a predetermined low signal threshold, and switch, when the measured serving cell signal is less than the predetermined low signal threshold, the current measurement mode to the short scan mode.

16. The system of claim 15, wherein the hardware controller is configured to reset, when the current measurement mode is the normal scan mode and the measured serving cell signal is less than the predetermined low signal threshold, the measured serving cell signal.

17. The system of claim 16, wherein the hardware controller is configured to change, when the current measurement mode is the normal scan mode and the measured serving cell signal is less than the predetermined low signal threshold, a serving cell signal measurement parameter for discontinuous reception (DRX)-independent parameters.

18. The system of claim 15, wherein the hardware controller is configured to determine, when the current measurement mode is the short scan mode, whether the measured serving cell signal is greater than a predetermined high signal threshold and switch, when measured serving cell signal is greater than the predetermined high signal threshold, the current measurement mode to the normal scan mode.

19. The system of claim 18, wherein the hardware controller is configured to attempt, when the current measurement mode is the short scan mode and the measured serving cell signal is not greater than the predetermined high signal threshold, cell reselection and switch, when a cell is selected as a result of cell reselection, the current measurement mode to the normal scan mode.

20. The system of claim 18, wherein the hardware controller is configured to change, when the current measurement mode is the short scan mode and the measured serving cell signal is greater than the high threshold, serving cell signal measurement parameters for discontinuous reception (DRX)-independent parameters.

* * * * *